Jan. 12, 1954

J. D. RUST 2,665,537

ROTARY COTTON FLUFFER

Filed April 27, 1953

INVENTOR.
JOHN D. RUST

BY
Estabrook & Estabrook

ATTORNEYS

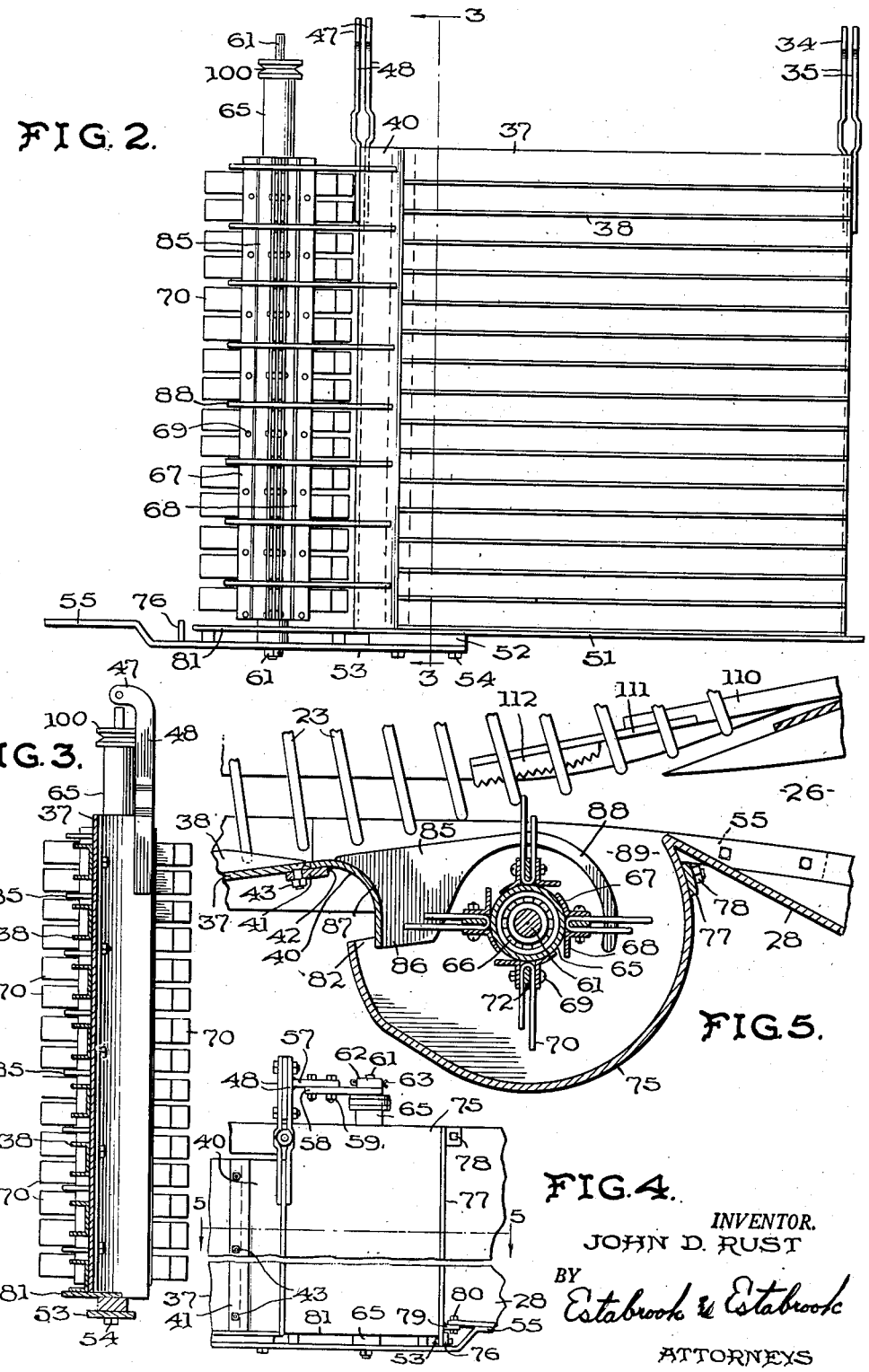

Patented Jan. 12, 1954

2,665,537

UNITED STATES PATENT OFFICE 2,665,537

ROTARY COTTON FLUFFER

John D. Rust, Pine Bluff, Ark.

Application April 27, 1953, Serial No. 351,229

6 Claims. (Cl. 56—42)

The present invention relates broadly to cotton picking machines and more specifically to a cotton picker unit having a rotary fluffer for fluffing the lint of open cotton bolls.

The present application is an improvement of my co-pending application Serial No. 219,145, filed April 4, 1951, now Patent 2,657,514.

It has been found from experience that healthy and mature cotton can be very effectively and efficiently picked by spindle type machines, such as a Rust cotton picking machine, when the lint of the open cotton boll is in a fluffy state. Under such conditions the moistened wire spindles of a cotton picking machine readily engage the lint of the open cotton boll and wind the cotton upon the spindles, thus thoroughly picking the open cotton from the stalk. Such a condition, however, does not always exist in a field of open cotton due to boll weavil infestation, "honeydew" or other adverse conditions. Under such circumstances a large percentage of the open cotton is not fluffy, and consequently it does not readily wind onto the spindles.

In certain of my previous designs I have employed either a stationary or a rotary type cotton fluffing device to overcome the aforementioned conditions. The rotary type of cotton fluffing device employed heretofore has associated with the rotatable flexible members a plurality of spaced guide members which have one end thereof mounted on or carried by the cotton picking unit. The free ends of the guide members extend between the rotatable flexible members for guiding the cotton plants into the path of rotation of the flexible members for fluffing the lint of the open cotton bolls.

It has been found from experience that the rotary type cotton fluffer and guide members employed heretofore have proven to be quite effective under the greater majority of conditions found to exist in a field of cotton. However, in fields of cotton wherein the plants contain a large percentage of green bolls the shape of the guide members and the manner of mounting them upon the cotton picking unit has tended to produce a surface that acted as a hindrance to the smooth passage of the green bolls from one end of the picking unit to the other as the cotton picking machine moved along a row of cotton plants. The green bolls as well as the open bolls of the cotton plant, in moving along the plant passageway of the picking unit, are engaged by the flexible members of the fluffer, which while fluffing the lint of the open bolls does not in itself damage the green bolls. There are times, however, when the flexible members in engaging a green boll will draw it between adjacent guide members so as to move it out of or to one side of the plant passageway so that as the cotton picking machine moves along the row of plants this green boll will in a sense be dragged back into the plant passageway. It is this dragging of the green bolls back into the plant passageway which results in the bolls being severed from the plant. Heretofore the manner of mounting the guide members on the picking unit tended to produce a section having a relatively sharp edge, so that the green bolls in being dragged back into the plant passageway would pass over this sharp edge resulting in some of the green bolls being severed from the plants.

The rotary cotton fluffer and guide members of the present invention are designed to provide a relatively smooth surface along one side of the picking unit plant passageway so that any green bolls on the cotton plants will have a relatively free and unobstructed passage through the picking unit.

The design of the rotary cotton fluffer and guide member structure of the present invention is such that it may be either included as an integral part of a picking unit at the time of constructing said unit or it may be used as an attachment for picking units that have already been constructed. Furthermore the design of the fluffer and guide member structure is such that it may be readily removed from the picking unit when so desired.

One of the objects of the present invention is to provide a cotton picking unit having a rotary fluffer with a plurality of spaced guide members for directing the cotton plants into engagement with the fluffer.

Another object is to provide a cotton picking unit having a plurality of guide members which are formed with a web like portion that is secured to a curved segment of said unit to provide a smooth surface for the passage of green cotton bolls.

Another object is to provide a cotton picking unit having a stalk crowder with a curved end portion to which are secured the curved edges of a plurality of guide members to define with the end of the stalk crowder a smooth and uninterrupted surface for the passage of green cotton bolls.

Further objects of the present invention are to provide a cotton picking unit having a rotary fluffer and guide member structure which is simple in design, economical of manufacture and easily and readily removed from or mounted in the picking unit.

Other objects and advantages more or less ancillary to the foregoing and the manner in which all of the various objects are realized will appear in the following description which, considered in connection with the accompanying drawings, sets forth the preferred embodiment of the invention.

Referring to the drawings wherein the preferred embodiment of the invention is illustrated:

Figure 2 is an elevational view of a cotton picking unit stalk crowder with the rotary fluffer and guide member structure of the present invention;

Figure 3 is a vertical sectional view of the forward end of the stalk crowder with the rotary fluffer and guide member structure mounted thereon, the view being taken on a plane indicated by line 3—3 of Figure 2;

Figure 4 is a side elevational view of the housing for the rotary fluffer showing the manner for mounting same upon the picking unit; and Figure 5 is an enlarged detailed sectional view of a portion of the cotton picking unit of Figure 1 showing the rotary fluffer and guide member structure, the section being taken on a plane indicated by line 5—5 of Figure 4.

Figure 1:
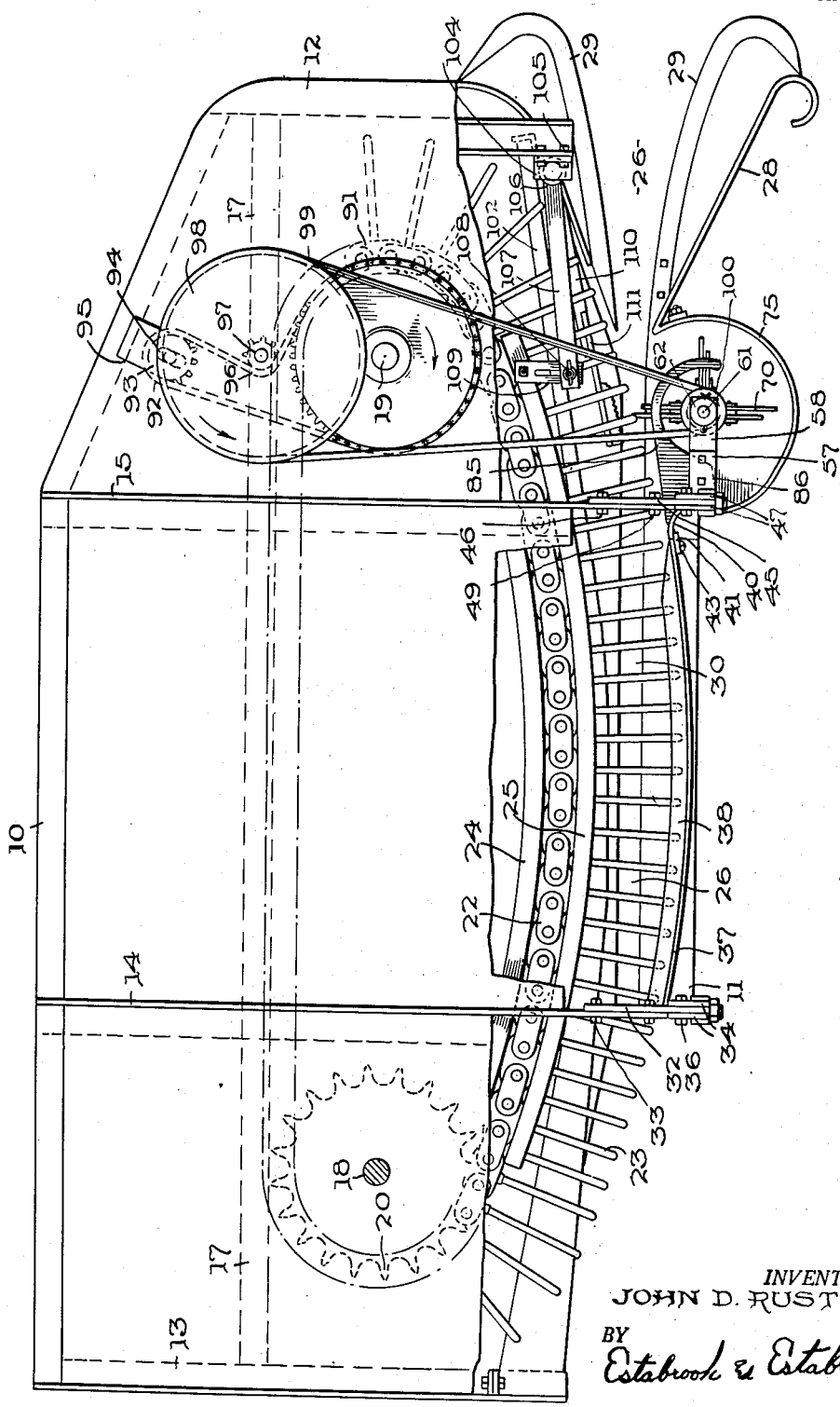
Figure 1 is a top plan view of a cotton picking unit showing the rotary fluffer and guide member structure of the present invention with a portion of the housing cover of the unit being removed.

Referring to the drawings there is shown in Figure 1 a Rust cotton picking unit having side frame members 10 and 11 and end frame members 12 and 13, the side frame members 10 and 11 have transverse frame bracing members 14 and 15 secured thereto by any suitable means. A longitudinally extending frame bracing member 17 is secured to the end frame members 12 and 13 and the transverse frame members 14 and 15, to help provide a rigid frame structure for the picking unit. The picking unit carrying structure is not illustrated, as it is not per se, a part of the present invention, however, the unit may be carried in any suitable manner by means of various structures such as are shown in Rust Patents 2,085,046; 2,175,216; 2,502,063 and others.

A drive shaft 18 and a driven shaft 19 are mounted in suitable bearing supports, not shown, on the frame structure of the picking unit. The shafts 18 and 19 have suitable sprockets mounted thereon, but only the top drive sprocket 20 on the shaft 18 is indicated in dotted lines in Figure 1. The sprockets on shafts 18 and 19 have chains 22 entrained thereabout for carrying spindle slats, not shown, which in turn have spindles 23 journaled therein. It is to be understood that the shafts 18 and 19 are provided with sprockets adjacent their top and bottom ends and each of the sprockets mounted on the respective shafts have chains entrained thereabout and the spindle slats may be connected to and extend between the top and bottom chains in a manner similar to that shown in Rust Patent 2,085,046 of June 29, 1937. The transverse frame members 14 and 15 have secured thereto adjacent one side of the picking unit guide rails 24 and 25 which are conventionally employed for guiding and supporting the top chain of the spindle conveyor.

A cotton plant passageway or tunnel 26 extends from the forward end of the cotton picking unit to the transverse frame member 14 so that the spindles 23, which project into the plant passageway, are capable of engaging the open cotton bolls of the plants moving through the passageway during the travel of the cotton picking machine along a row of plants. The forward end portion or entrance of the plant passageway 26 is defined by curved elements 28, which together with boll lifting elements 29 engage and direct the cotton plants into the picking section 30 of the plant passageway 26 as the cotton picking machine moves along a row of plants. All of the foregoing parts and elements are conventional in a Rust cotton picking unit and, per se, do not constitute a part of the present invention, thus a more detailed description of said parts or elements is not deemed necessary.

The transverse frame member 14 has a vertically extending plate 32 secured thereto at one end by suitable bolts 33. A pair of arms 34 are secured to opposite sides of the plate 32 and project outwardly beyond the side frame member 11 with the ends of said arms terminating in downwardly extending portions 35, see Figure 2. The arms 34 are secured to the plate 32 by a nut and bolt 36 for pivotal movement with respect thereto. A spring, not shown, is connected to the depending portions 35 and the frame member 11 to permit a slight yielding movement of said depending portions 35 of the arms 34 with respect to the frame member 11. The depending portions 35 of the arms 34 have positioned therebetween and secured thereto in any suitable manner the rear end portion of a stalk crowder 37 which extends between the transverse frame members 14 and 15. The stalk crowder 37 in constituting a portion of the outer wall of the picking unit defines not only a portion of the plant passage 26, but also the picking section 30 of the plant passageway 26.

The inner surface or face of the stalk crowder 37 is provided with a plurality of vertically spaced ribs or channel members 38, Figure 2, which define passages through which the outer ends of the spindles 23 move upon the rotation of the conveyor chains 22. The forward or front end of the stalk crowder 37 terminates in an outwardly projecting vertically extending curved portion or member 40, Figures 1 and 5, which member may be formed as an integral part of the stalk crowder or it may be formed as a separate member that may be detachably secured to the stalk crowder. If the member 40 is formed as a separate part of the stalk crowder the edge or end which abuts the front of the stalk crowder has a plate like member 41 welded as at 42 to its outer surface. The plate 41 is then secured to the front end of the stalk crowder by suitable nuts and bolts 43 so that the inner edge or end of the member 40 is brought into abutting engagement with the forward end of the stalk crowder 37, and thereby provides a smooth continuous and uninterrupted surface along the inner side or surface of the member 40 and the inner surface of the stalk crowder 37. That is, the member 40 is so positioned with respect to the forward end of the stalk crowder that the inner surface of the member 40 and the inner surface of the stalk crowder 37 provide a smooth continuous and uninterrupted surface for the free and unobstructed passage of any green cotton bolls that may be carried on the plants.

The transverse frame member 15 has a vertically extending plate 45 secured thereto at one end by suitable bolts 46. A pair of arms 47 are secured to opposite sides of the plate 45 and project outwardly beyond the side frame member 11 with the ends of said arms terminating in downwardly extending portions 48, see Figures 2 and 3. The arms 47 are secured to the plate 45 by a nut and bolt 49, Figures 1 and 4, for pivotal movement with respect thereto. A spring, not shown, is connected to the depending portions 48 and the frame member 11 to permit a slight yielding movement of said depending portions 48 of the arms 47. The depending portions 48 of the arms 47 have interposed therebetween and secured thereto in any suitable manner the upper free outer edge portion of the curved member 40. Thus the stalk crowder 37 and its curved forward end portion or member 40 are secured between the depending portions 35 and 48 of the arms 34 and 47, respectively, which arms are in turn pivotally mounted on the plates 32 and 45 that are secured to the transverse frame members 14 and 15, respectively.

The bottom or lower edge 51 of the stalk crowder 37, Figure 2, has a forwardly extending plate or supporting member 53 mounted thereon by suitable bolts 54. A spacer member 52 is interposed between the plate member 53 and the bottom of the stalk crowder. The supporting member 53 is provided with an offset forward end portion 55, which is adapted to support the lower edge portion of the curved plant guiding element 28 positioned at the entrance of the plant passageway 26.

One of the arms 47 has secured thereto in any suitable manner an outwardly projecting bracket 57, Figures 1 and 4, to which a plate member 58 is affixed by nuts and bolts 59. The plates 58 and 53 are adapted to support a shaft or rod 61, which rod projects through suitable apertures provided in said plate members. The upper end of the rod or shaft 61 extends through a cap member 62 which is secured to the top surface of the plate member 58 and a cotter pin 63 extends across and through said cap member 62 and shaft 61 for securing said shaft or rod against rotation or vertical movement. A rotary member 65 is mounted for rotation on the shaft or rod 61 intermediate the plate members 58 and 53. Suitable bearings 66, Figure 5, are interposed between the rotary member 65 and shaft 61 so that the rotary member 65 will have a free rotative movement with respect to the shaft 61.

The rotary member 65 has secured to the outer surface thereof, at diametrically opposite points, and by any suitable means, angle brackets 67 which extend throughout the greater portion of the length of said rotary member. A complementary clamping member 68 is secured to each of the brackets 67 throughout the length of the brackets by suitable nuts and bolts 69. The brackets 67 and clamps 68 have mounted therebetween a plurality of vertically spaced flexible members or flaps 70. As shown in Figure 5, the flaps 70 are folded in back to back relation so that as the outer end portions of the flaps 70 become worn the individual flaps may be released from between the bracket 67 and clamp 68 and adjusted by moving one end of the flap in towards said bracket and the other end out from said bracket to the proper operating position, thus compensating for the worn position of the flap. A metallic stiffening plate or member 72 is inserted between adjacent pairs of flaps 70 at the inner folded portion of the flaps and said plate member 72 is retained in position by the nut and bolt 69, which projects, between adjacent flaps 70, through the bracket 67, clamp 68 and the plate member 72. Thus to adjust or replace any one of the flaps 70 the nuts and bolts 69 are loosened so as to loosen the clamp 68 from the bracket 67 whereupon the flaps 70 may be readily adjusted or replaced. Thus the rotary member is provided throughout its length with a plurality of spaced flexible members or flaps which are adapted to engage the open cotton bolls as the cotton plants pass through the passageway 26.

A housing 75, Figures 4 and 5, is provided for enclosing the outer portion of the rotary member 65 and the flexible members 70, and is spaced a sufficient distance from the outer ends of the members 70 to permit said members to have a free rotative movement within the housing. The plate member 53, Figure 4, is provided with a vertically extending projection 76 to which is secured in any suitable manner a post 77. The post 77 at its upper end is secured to the upper edge portion of the housing 75 by suitable nuts and bolts 78, while the lower end portion of the post 77 is provided with a lug 79 to which the lower inner edge of the member 28 is secured by suitable bolt 80. The housing 75 has a floor 81, Figure 2, which is provided with an enlarged aperture through which projects the rotatable member 65. The rear end portion of the housing 75 is spaced from the outermost edge portion of the member 40 to provide an air inlet passage 82 so that upon rotation of the rotary member 65 air will be drawn into the housing 75.

As shown in Figures 2 and 3 the curved end portion or member 40 of the stalk crowder 37 has projecting therefrom throughout its height or length a plurality of spaced guide members or fingers 85 which are arranged in a common vertical plane. As shown in Figures 1 and 5 the guide members 85 are formed with an enlarged web portion 86 which has a curved edge 87 that engages the curved member or end portion 40. The enlarged web portion 86 of the guide members 85 are disposed in a horizontal plane or in a plane normal to the vertical plane of the stalk crowder 37 so as to define a flat horizontal surface over which the green cotton bolls are adapted to pass. The guide members or fingers 85 project from the curved end portion or member 40 along one side of and towards the entrance of the plant passageway 26 and terminate in relatively narrow free end portions 88, which are curved and arranged to extend around the rotary member 65 but in spaced relation therewith. The guide members 85 are so positioned on the curved end portion or member 40 as to permit adjacent flexible members 70 to pass therebetween in their path of rotation. The forward free end portions 88 of the guide members 85 are spaced from the forward portion of the housing 75 to provide a discharge opening 89 for said housing, which opening is free of any obstructions. Thus upon the rotation of the rotary member 65 the flaps 70, in their path of rotation, are adapted to move between adjacent guide members or fingers 85 and any loose cotton, that might be drawn into the housing 75 by the flaps 70, will be freely ejected from the housing 75 through the opening 89 and delivered into the plant passageway so that the loose cotton may be engaged by the spindles 23 as said spindles move into the plant passageway 26.

The curved end portion or member 40 and the guide members 85 may be formed as separate elements with the guide members being secured to the curved member 40 in vertically spaced relation with one another and in a common plane. However, the curved end portion or member 40 and the guide members 85 may be formed as an integral structure, such as by a casting operation.

The driven shaft 19, Figure 1, has a sprocket 91 secured to the top end portion thereof with a sprocket chain 92 entrained thereabout. The chain 92 passes around an idler sprocket 93 that is rotatably mounted on a shaft 94 supported on a bracket 95 which is secured to the side frame member 10. The chain 92 also passes around a sprocket 96, which is rotatably mounted on a shaft 97 that is secured on the longitudinal frame member 17. There is also rotatably mounted on the shaft 97 a pulley 98 which has its hub rigidly secured to the hub of the sprocket 96 so that the sprocket 96 and pulley 98 rotate as a unit. A belt 99, preferably of the V-type is entrained about the pulley 98, also around a pulley 100, which is secured to the rotary member 65. Thus, upon the rotation of shaft 19 and sprocket 91, in the direction of the arrow shown in Figure 1, the sprocket chain 92 passing around idler sprocket 93 will drive sprocket 96 and pulley 98. The direction of rotation of shaft 19 is counter to the direction of rotation of sprocket 96 and the pulley 98. Therefore the belt 99 will rotate pulley 100 and member 65 in the same direction as the pulley 98. Thus the movement of the rotary member 65 and spindles 23 are in proper relation with respect to each other for the purpose desired.

The front and rear end frame members 12 and 13 have secured thereto, in vertically spaced relation, a plurality of stalk guards 102 which extend along the inner side of the plant passageway and constitute the inner wall of said passageway. Thus the plant guide member 28 and stalk crowder 37, together with the stalk guards 102 constitute the inner and outer walls of the plant passageway 26 and the stalk guards 102 and stalk crowder 37 define the picking section 30 of the plant passageway 26 in the cotton picking unit.

The frame member 12 has an angular shaped plate member 104 secured thereto by suitable nuts and bolts 105. A complementary plate member, not shown, is secured to a lower transverse frame member, not shown, of the picking unit which corresponds to the frame member 12. A vertically extending post 106 is interposed between the angular shaped brackets for rotative movement with respect thereto. The upper end of the tubular post or member 106 has an outwardly extending arm 107 affixed thereto. The free end of the arm 107 is provided with a nut and bolt 108 which bolt projects through a slot provided in an arm or bracket 109 that is secured to the forward end of the guide member 25. The tubular member 106 has affixed thereto, for rotative movement therewith, a plurality of vertically spaced arms 110, which have secured to their outer ends guide fingers or members 111, that have serrated rubber facing members 112, Figure 5, secured thereto. Thus upon adjusting the bolt 108 within the slot provided within the member 109 the serrated rubber facing members 112 on the face of the arms 110 will be moved into or out of the plant passageway 26 and in a direction towards and from the flexible members 70 of the rotary member 65. The serrated rubber facing members 112 carried by the arms 110 not only aid in fluffing the lint of some of the open cotton bolls, but at the same time will guide the cotton plants into the path of rotation of the flexible members 70.

In the operation of the present invention the member 65 is rotated simultaneously with the rotation of the cotton picking mechanism. Thus as the cotton picking machine moves along a row of cotton plants the plants are directed into the plant passageway 26 by the members 28 and 29. As the cotton plants enter the plant passageway the serrated guide members 112 and guide fingers 85 engage the plants and guide them into the path of rotation of the flaps 70, which flaps strike the open cotton bolls and thus fluff the lint so that it is in the best condition for being engaged and wrapped around the rotating spindles 23.

If some of the cotton plants still have green bolls thereon the flexible members 70 in engaging said bolls will not damage or break them off from the plants, but some of the green bolls may be directed between the spaced guide members 85 by the flexible members 70 in their path of rotation. The green bolls which are directed between the guide members 85 will land or fall upon the web like portion of the guide members 85, and, as the cotton picking machine moves along the row of cotton plants, the green bolls will be drawn over the web like portions of the guide members and up against the rounded or curved end portion or member 40 where they will slide or move around this curved portion and then along the inner surface of the stalk crowder 37. The rounded or curved end portion or member 40, together with the web like portion or segment of the guide members 85 provides a smooth flat and uninterrupted surface over which the green cotton bolls are adapted to pass, so that these bolls will not be damaged or harmed in any manner in their travel through the plant passageway 26.

The web like portion of the guide members 85 insures that the green bolls will not become entwined about the guide members 85. If any green bolls are directed onto the web like portions 86 they will, upon the movement of the cotton picking machine along a row of cotton plants, be drawn over the flat surface of the web like portion 86 and into engagement with the curved end member 40 so as to provide a smooth surface for the passage of the green bolls.

I claim:

1. A cotton picking unit having a stalk crowder mounted thereon, a vertically extending curved shaped member secured to one end of said crowder, a plurality of vertically spaced members secured to said curved shaped member and arranged to project therefrom in a common vertical plane, said vertically spaced members having a web like portion with an edge curved to conform with said curved shaped member, said vertically spaced members constituting guides for the cotton plants.

2. A cotton picking unit having a stalk crowder mounted thereon, said stalk crowder having an outwardly curved end portion, a plurality of vertically spaced guide members secured to said curved end portion and arranged to project therefrom in a common vertical plane, said guide members formed with an enlarged web like portion that terminates in a reduced curved end portion for guiding cotton plants towards said stalk crowder, the enlarged web like portion of said guide members being secured to said outwardly curved end portion in a plane normal to the vertical axis of said outwardly curved end portion and defining with said outwardly curved end portion a smooth and unobstructed surface for the passage of the cotton plants.

3. In a cotton picking unit having a front and rear end with a cotton plant passageway extending from the front end to the rear end, a stalk crowder mounted on said unit and defining a portion of said passageway, the portion of said stalk crowder adjacent said front end terminating in a curved member, a rotatable member mounted in said unit adjacent said curved member, a plurality of flexible members secured to said rotatable member and projecting therefrom, said flexible members extending into said passageway in their path of rotation, a plurality of vertically spaced members projecting in a common plane from said curved member towards said front end, said vertically spaced members extending between said flexible members for guiding cotton plants into the path of rotation of said flexible members, the free ends of said vertically spaced members being curved and arranged to extend partially around said rotatable member in spaced relation therewith.

4. In a cotton picking unit having a front and rear end with a cotton plant passageway extending from the front end to the rear end, a stalk crowder mounted on said unit and defining a portion of said passageway, a rotatable member adapted for use in said unit and arranged to be detachably mounted in said unit intermediate said stalk crowder and said front end, a plurality of flexible members secured to said rotatable member and arranged to project into said passageway, said stalk crowder provided with an outwardly curved end portion adjacent said rotatable member, a plurality of guide members having a web portion with a curved edge secured to said outwardly curved end portion, said guide members being disposed in vertically spaced relation on said curved end portion and arranged to project therefrom in a common vertical plane towards said front end, said guide members terminating in relatively narrow free end portions extending between said flexible members for guiding cotton plants into the path of rotation of said flexible members, the web portion of said guide members being disposed in a plane normal to the vertical axis of said stalk crowder and defining with said outwardly curved end portion a smooth and unobstructed surface for the passage of the cotton plants along said passageway.

5. In a cotton picking unit having a front and rear end with a cotton plant passageway extending from the front end to the rear end, a stalk crowder mounted on said unit and defining a portion of said passageway, a rotatable member adapted for use in said unit and arranged to be detachably mounted in said unit intermediate said stalk crowder and said front end, a plurality of flexible members secured to said rotatable member and arranged to project into said passageway, said stalk crowder provided with an outwardly curved end portion adjacent said rotatable member, a plurality of guide fingers having an enlarged web portion with a curved edge affixed to said outwardly curved end portion, said guide fingers being secured to said curved end portion in vertically spaced relation and arranged to project therefrom in a common vertical plane towards said front end, said guide fingers terminating in curved end portions arranged to extend around a portion of said rotatable member in spaced relation therewith, a plurality of spaced guide members adjustably mounted on said unit near the front end and opposite said rotatable member, said guide members having serrated rubber members affixed thereto and adapted to be moved into and out of said plant passageway, said guide fingers and guide members adapted to guide cotton plants in said passageway into the path of rotation of said flexible members, the web portion of said guide fingers defining with said outwardly curved end portion a smooth and unobstructed surface for the passage of the cotton plants along said passageway.

6. In a cotton picking unit having a front and rear end with a cotton plant passageway extending from the front end to the rear end, a stalk crowder carried by said unit and defining a portion of said passageway, a rotatable member adapted for use in said unit and arranged to be detachably mounted on said stalk crowder adjacent said front end, a plurality of flexible members secured to said rotatable member, a housing for said rotatable member carried by said stalk crowder, an outwardly curved member detachably mounted on said stalk crowder adjacent said rotatable member and arranged to extend between the top and bottom edges of said stalk crowder, a plurality of spaced guide fingers mounted on said outwardly curved member with the free ends thereof arranged to project towards said front end, the free ends of said guide fingers being curved and arranged to extend partially around said rotatable member in spaced relation therefrom and into said housing, said guide fingers guiding the cotton plants into the path of rotation of said flexible members for engaging and fluffing the cotton, said guide fingers having an enlarged web portion formed with a curved edge, the curved edge of said guide fingers being mounted on said outwardly curved member with the web like portion disposed in a plane normal to the vertical axis of said outwardly curved member, the web like portion of said guide fingers and said outwardly curved member defining a smooth and unobstructed surface for the passage of the cotton plants into engagement with the stalk crowder.

JOHN D. RUST.

No references cited.